Jan. 12, 1954     G. L. OMON ET AL     2,665,928

COUPLING

Filed Oct. 27, 1948

Inventors
Gene L. Omon
Keert E. Hokanl
By Soans, Pond & Anderson
Attorneys

Patented Jan. 12, 1954

2,665,928

UNITED STATES PATENT OFFICE 2,665,928

COUPLING

Gene L. Omon and Kurt E. Hohnl, Racine, Wis., assignors to J. I. Case Company, Racine, Wis., a corporation of Wisconsin Application October 27, 1948, Serial No. 56,824

1 Claim. (Cl. 285—168)

The present invention relates to couplings for fluid systems, and in particular relates to readily separable and readily connectible valved couplings for interconnecting fluid conduits.

Valved couplings of the subject type usually include a male connecting member and a female connecting member which are adapted to be releasably inter-engaged with one another, each of the members being adapted to be attached to a separate fluid conduit. Each connecting member is provided with a valve mechanism which automatically closes the conduit associated with that member when the members are disconnected and which automatically opens the associated conduit when the members are interengaged or interconnected. Thus, when the two members are interconnected, hydraulic fluid can flow freely between the conduits, and when the two members are disconnected the ends of the conduits are automatically sealed to prevent the loss of hydraulic fluid. Valved couplings of the class described are particularly useful in hydraulic systems which must be frequently connected and disconnected, as for example, in the hydraulic systems which extend between coupled vehicles wherein a hydraulic pressure unit on one vehicle is adapted to operate a hydraulically actuated device on another vehicle.

The principal object of the present invention is the provision of an improved, valved coupling of the class described which will overcome the deficiencies of the prior art devices, which will be relatively inexpensive to manufacture, and which will be operable to connect two high pressure fluid systems with minimum effort by the operator. A more specific object of the invention is the provision of an improved valve mechanism for use in valved couplings which will seal the fluid conduits associated with the coupling whenever the coupling members are disconnected with greater efficiency than the previously known devices. Another object is the provision of a valve mechanism which is easily connectible when there is considerable pressure in one of the hydraulic conduits. Further objects and advantages of the invention will become apparent by reference to the accompanying drawings and the following description of one embodiment thereof.

In the drawings:

Fig. 1 is a sectional, elevational view of a two-member, valved coupling in accordance with the invention, the connecting members being separated;

Fig. 2 is an elevational view, partly in section, of the valved coupling shown in Fig. 1, the two connecting members being shown interconnected;

Fig. 3 is an enlarged sectional view showing the resilient retaining ring which constitutes a part of the female portion of the coupling;

Fig. 4 is an enlarged, sectional view taken showing the valve packing or sealing ring and the valve seat, which together constitute a part of the valve mechanism for sealing the respective hydraulic conduits, the valve being positioned to permit the passage of hydraulic fluid;

Fig. 5 is a view similar to Fig. 4 showing the valve as it moves towards the seated or closed position;

Fig. 6 is a view similar to Figs. 4 and 5 showing the valve in the seated or fully closed position;

Fig. 7 is a fragmentary, perspective view of the female member of the coupling; and Fig. 8 is a sectional view taken along line 8—8 in Fig. 1.

As before pointed out, a valved or self-sealing, break-away coupling, in accordance with the invention, includes a male connecting member and a female connecting member which are adapted to be interengaged and releasably locked together. Each of the connecting members also includes a housing which is adapted to contain a spring pressed valve mechanism for sealing off the end of its associated conduit when the male and female connecting members are disengaged from each other. The housing for the male connecting member and the housing for the female connecting member are proportioned so that they may be slidably engaged with one another, and suitable packing rings are provided to effect a fluid tight seal between these elements. The housing for the female member is provided with a locking means which is adapted to releasably engage a portion of the male section of the coupling to releasably lock the two sections together.

In the illustrated embodiment of a coupling in accordance with the invention, the male connecting member, indicated at 11 in Fig. 1, includes an adapter 13 which is provided with a threaded portion 15 at one end to facilitate attachment of the male connecting member 11 to a fluid conduit 17, a generally tubular housing 19 which is adapted to be attached to the other end of the adapter 13, and a spring pressed valve mechanism 21 which is disposed within and which is coaxial with the housing 19. The adapter 13 is a hollow-fitting fabricated from metal or the like which is provided at its rearward end with the threaded portion 15 for attachment to the associated conduit 17 and at its forward end with a second threaded portion 23 which is adapted to engage the housing 19. The hollowed out portion of the fitting is of generally frusto-conical shape, as illustrated at 25 in Figs. 1 and 2, the hollow portion 25 enlarging from a point adjacent the conduit 17 to a point adjacent the housing 19. The frusto-conical shape of the hollowed out portion of the adapter 13 causes the liquid flowing through the fitting to assume streamline flow characteristics whereby heating of the hydraulic fluid and of the coupling due to fluid friction is materially reduced.

The housing 19 which forms a part of the male connecting member 11 is generally tubular in form and is provided with a threaded portion 27 on the inner surface of one end for attachment to the threaded portion 23 on the adapter 13. The adapter 13 and the housing 19 are provided with multi-sided collars, 29 and 31 respectively, whereby the two elements may be gripped with wrenches to facilitate assembling the connecting member. The outer surface of the housing 19 is provided with a raised camming portion 33 and a circumferential groove 35, this groove 35 providing means for locking the male connecting member 11 of the coupling into the female connecting member as will appear more clearly hereinafter. The forward end of the tubular-shaped housing 19 is flanged inwardly to form a shoulder 37 which is bevelled to provide a seat 39 for the valve mechanism 21.

The valve mechanism 21 which is disposed within the housing 19 of the male connecting member 11 includes a valve guide or cylinder 41, a valve piston 43 which is adapted to support a ring of packing material 45 for sealing the forward end of the housing 19, and a valve spring 47 which is adapted to act between the valve guide 41 and the valve piston 43 to bias the sealing ring 45 against the bevelled seat 39 provided at the forward end of the housing 19. The valve guide 41 comprises a hollow cylindrical member 49 which is closed at one end and which has three, spider-like supports 51 extending transversely from the closed end as is particularly shown in Fig. 8. The supports 51 are adapted to be clamped between the threaded forward portion 23 of the adapter 13 and shoulder 53 on the inner surface of the housing 19. The cylinder portion 49 extends longitudinally of the housing and is disposed with its longitudinal axis coinciding with the longitudinal axis of the housing 19. The forward end of the cylinder portion of the valve guide 41 is fabricated with a portion of reduced diameter, 55, on its external surface to provide a bearing surface 57 for the spring 47.

The valve piston 43 also includes a hollow, cylindrical section 59 which is adapted to fit within the cylindrical portion 49 of the valve guide 41 and which has a diameter substantially equivalent to the internal diameter of the inwardly flanged shoulder 37 of the housing 19. A circumferentially extending bearing ridge 61 for providing a permanent seat for the sealing ring 45 and for providing a bearing surface for the forward end of the spring 47 is provided on the outer surface of the piston 43 inwardly of the flanged forward end of the housing 19.

A groove 63 is provided in the surface of the valve piston 43 which is disposed within the valve guide 41, and a ring of resilient sealing material 65 is disposed within the groove 63 to provide a fluid-tight seal between the inner surface of the valve guide 41 and the outer surface of the valve piston 43. The ring of resilient sealing material 65 is preferably of the O ring type. An O ring seal is a washer-like element which is usually fabricated from synthetic rubber. The O ring as its name implies is circular in form and is circular in cross section. The ring is fabricated in such a manner that the surface of the ring presents the smooth, unbroken surface of a tore. The O ring seal depends upon the toroidal shape of the sealing element and upon the pressure of the hydraulic fluid being retained instead of upon a pressure joint as in the case of ordinary packing. Accordingly, the groove for receiving an O ring is proportioned with its depth slightly shallower than the cross sectional diameter of the O ring to provide mere contact with the other moving element.

The forward end of the valve piston 43 extends beyond the shoulder 37 at the forward end of the housing 19 to provide an engaging stub 67. As illustrated in Fig. 2, the engaging stub 67 is adapted to bear against the valve mechanism of the female connecting member as will be hereinafter described. A longitudinally extending passageway 69 is provided through the engaging stub to permit air and hydraulic fluid to enter and to escape from the space between the valve guide or cylinder 41 and the valve piston 43 when the valve mechanism 21 is moved from the open to the closed position.

The forward end of the housing 19 is maintained closed at all times when the male and female connecting members are disengaged. The forces maintaining the valve mechanism closed are the sum of the forces exerted by spring 47 between the bearing ridge 61 on the valve piston 43 and the shoulder 57 formed in the outer cylindrical surface of the valve guide 41 and the force exerted by the hydraulic fluid in the conduit 17 which acts against the exposed area of the piston 43. However, since the area of the piston 43 exposed to hydraulic fluid is relatively small, the force required to open the valve is relatively small even when fluid under high pressure is contained in the conduit.

The female connecting member is particularly shown at 71 in Fig. 1 and includes an adapter 13a, a housing 73, a valve mechanism 21a, and a locking means 75 for releasably engaging the female member 71 with the male member 11. Since the adapter 13a and the valve mechanism 21a for the female connecting member 71 may be identical to the adapter 13 and the valve mechanism 21 which have been described in connection with the male connecting member 11, the same reference numerals will be applied to corresponding elements, these reference numerals carrying the suffix "a." However, the adapter 13a on the female connecting member 71 illustrated in the drawings is provided with a semi-permanent connection to its associated hydraulic conduit, 17a.

The housing 63 for the female connecting member 71 is an elongated, hollow member of circular cross-section which includes a valve chamber 76 at its rearward end and an enlarged portion at its forward end which provides a receptacle or socket 77 for receiving the male connecting member. The enlarged socket portion 77 is also adapted to support the means for inter-locking the male and female connecting members, 11 and 71 respectively. The rearward end of the housing 73 is provided with a threaded section 79 which is adapted to be attached to the adapter 13a in the manner described in connection with the male connecting member 11.

The valve chamber 76 is generally cylindrical in shape, and its forward end is provided with an inwardly extending annular flange 81 which includes a bevelled valve seat 83. A valve guide 41a and a valve piston 43a, which are of the same construction as the valve guide and piston 41 and 43 respectively, are disposed within the valve chamber 76, the valve-guide-supports 51a bearing against the forward end of the adapter 13a. A spring 47a is disposed between the valve guide 41a and the valve piston 43a as described in connection with the male connecting member 11 to bias a packing ring 45a against the valve seat 83.

An annular groove 85 is provided in the inner surface of the receptacle or socket portion 77 of the housing forwardly of the flanged valve seat 83, and an O ring 87 is fitted therein to provide a seal between the inner surface of the socket 77 and the outer surface of the housing 19 for the male connecting member 11, when the two members are locked together.

The locking means 75 for inter-engaging the male and female connecting members includes a plurality of circumferentially disposed, spaced-apart balls 89 which are supported at the forward end of the socket-like portion 77 of the housing 73 and which are adapted to be moved into and out of engagement with the peripheral groove 35 provided on the external surface of the housing 19 for the male member 11. The locking balls 89 may be ball bearings or the like, and in order to maintain each of the balls in a predetermined radial position, a plurality of spaced-apart ball positioning apertures 91 are provided around the periphery of the socket 77 as illustrated in Fig. 7. The apertures 91 have a diameter which is slightly larger than the diameter of the balls 89 in order to permit radial movement of the balls 89 relative to the housing 73. A band 93 (Fig. 7), which is desirably fabricated from spring steel, is fitted into a groove 95 which extends around the inner surface of the socket portion 77 of the housing 73 adjacent the ring of apertures 91 to provide a seat for the band 93. The band 93 is adapted to limit the inward movement of the balls and to prevent them from falling into the housing. Accordingly, the band 93 is provided with a plurality of holes 97 which have a diameter which is slightly smaller than the diameter of the balls 89, and the holes 97 are spaced to register with the ball positioning apertures 91. To facilitate the insertion of the band 93 into the groove 95, the band 93 is split as indicated at 99 in Fig. 7. The locking balls 89 may also be supported in the socket-like portion 77 by tapering the sides of the apertures 91 in a manner such that the balls 89 may move into and out of engagement with the groove 35 provided on the male member 11. This is accomplished by providing apertures 91 having a frusto-conical shape and extending outwardly from a diameter which is slightly less than that of the locking balls 89.

The locking balls 89 are maintained in the innermost or locking position and in engagement with the ball retaining band 93 by a sleeve 101, biased by a spring 103, which is slidably supported for longitudinal movement on the forward end of the housing 73. In order to provide a rearward bearing surface for the sleeve 101 and to provide a guide for the spring 103 which biases the sleeve 101, the external surface of the housing 73 rearwardly of the ball positioning apertures 91, is provided with an annular rib 105 which includes a bearing surface 107 for the sliding sleeve 101. The surface of the housing 73 forwardly of the ball positioning apertures 91 is provided with an annular groove 108 (Fig. 3) having a generally semi-circular cross-section. The groove 108 is adapted to receive a resilient O ring 109 which serves as a dust seal and as a retainer for the sleeve 101.

The sliding sleeve 101 is generally tubular in shape and includes a section at its rearward end which has an internal diameter substantially equal to the diameter of the annular rib 105 on the housing 73 and a section which has a reduced diameter at its forward end substantially equal to the diameter of the forward end of the housing 73. This construction provides a shoulder 111 whose rearward surface 113 serves as a bearing surface for the biasing spring 103. When the sleeve 101 is placed over the enlarged forward end of the housing 73, an annular space 112 is provided which is adapted to contain the biasing spring 103 (Fig. 1). The shoulder 111 on the inner surface of the sleeve 101 provides a cam surface which is adapted to bear against the locking balls 89 and the resilient, sleeve retaining ring 109. The sleeve 101 extends forwardly of the ring and is under cut to provide an overhanging rim 115 which permits outward radial movement of the balls 89 when the connecting members are being moved into and out of engagement with each other. The relative dimensions of the parts are such that the balls 89 are prevented from dropping out of the apertures during the coupling and uncoupling operations.

The cross-sectional diameter of the resilient sleeve retaining ring 109 is such that the center, c, of the ring 109 lies below the surface, s, of the housing 73 (Fig. 3). Thus it is apparent that the cross-sectional diameter of the ring 109 is greater than, but less than twice the depth of the groove 108. The forward surface of the sleeve 101 is machined in a manner such that shearing forces upon the retaining ring 109 are minimized. A particularly satisfactory cam surface is provided when the forward portion of the shoulder 111 is machined at an angle of about 45°, the angle a in Fig. 3, to form an angularly disposed surface 117. The angular surface of the shoulder 111 causes substantially all of the forces exerted by the biasing spring 103 upon the resilient retaining ring 109 to be absorbed by the ring in compression rather than in shear.

The sliding sleeve 101 and the shoulder 111 are proportioned so that the rearward end of the sleeve 101 completely covers the rib 105 when the angular forward surface 117 bears against the resilient retainer ring 109, and at this point, the inner surface shoulder 111 holds the locking balls 89 in their innermost position against the ball retaining band 93. As the sleeve 101 is moved rearwardly along the housing 73, compressing the spring 103, the ball-engaging surface of the shoulder 111 uncovers the balls 89 and permits them to move radially outwardly from the retaining band 93 into the space provided by the overhanging rim 115. When the sleeve 101 is released, it moves forwardly due to the biasing action of the spring 103, and the angularly disposed surface 117 acts upon the balls 89 and forces them into the holes 97 provided in the ball retaining band 93.

The constructional features of the locking means 75 provided on the illustrated coupling are one of the important features of the invention. The angularly disposed cam surface 117 controls the position of the locking balls 89, provides a dust tight seal for the ball locking mechanism 75 when the sliding sleeve 101 is in the forward position against the resilient retainer ring 109, and applies the reaction forces exerted by the biasing spring 103 to the resilient retainer ring 109 as compressive forces rather than as shearing forces. As has been pointed out above, the rearward end of the sleeve 101 covers the rib 105 at all times, thus preventing dust and other foreign materials from working into the annular spring-containing space. The combination of the sleeve and rib construction and the angled cam and the resilient retainer ring assures positive, dust-free operation of the inter-locking means even under adverse conditions.

In order to inter-engage the male and the female connecting members, the sliding sleeve 101 is moved rearwardly along the housing 73 of the female member 71 and the male coupling member 11 is inserted in the socket 77 provided in the housing 73 to a point where the locking balls 89 will engage the groove 35 formed in the male connecting member 11. The sleeve 101 is then released and the action of the biasing spring 103 pressing against the shoulder 111 automatically returns the sleeve 101 to its normal position, causing the lower or camming surface of the shoulder 111 to hold the locking balls in the groove 35 in the male connecting member 11. As the male and female connecting members 11 and 71 are interengaged, the forward valve piston portions 67 and 67a of the valve mechanisms 21 and 21a engage one another thereby causing the packing 45 and 45a to unseat from the bevelled seats 39 and 83 respectively, as the members 11 and 71 are moved into locking engagement. Thus, both of the valve mechanisms are opened and hydraulic fluid can flow between the conduits 17 and 17a. In this connection, it should be noted that the O ring seal 87, provided around the internal portion of the socket 77, is located in a position such that the O ring 87 engages the housing 19 of the male connecting member 11 to provide a fluid tight seal before the engaging stubs 67 and 67a move the valves into the open position.

When the connecting members are interengaged, air entrapped in the chambers formed between the valve pistons 43 and 43a and their respective valve guides 41 and 41a will escape freely through the passageways 69 and 69a as the valve pistons move rearwardly. The abutting relationship of the forward valve piston portions 67 and 67a does not constitute a fluid type seal since they are merely machined parts and consequently, it does not prevent the escape of the entrapped air. This construction, therefore, allows the connecting members to be united with a minimum pressure.

After the connecting members are united, the high pressure hydraulic fluid which surrounds the forward exterior portions of the pistons 43 and 43a will seep between the abutting faces of the forward valve piston portions 67 and 67a and through the passageways 69 and 69a into the interior of the valve pistons 43 and 43a where the air pressure was initially at atmosphere pressure. As a consequence, the chambers formed between the valve pistons 43 and 43a and their respective valve guides 41 and 41a will become partially filled with hydraulic fluid during operation.

To disconnect the two connecting members, the sliding sleeve 101 is moved rearwardly on the female coupling 71 and the locking balls are permitted to move outwardly from the innermost or locking position, whereupon the springs 47 and 47a in the valve mechanisms and the pressure within the hydraulic system act to force the coupling members apart. As the connecting members move apart, the rings of packing material 45 and 45a carried by the valve pistons are engaged against their respective valve seats to effectively seal the associated conduits 17 and 17a.

When the connecting members are disengaged, the hydraulic fluid will drain out of and air will enter into the chambers formed between the valve pistons 43 and 43a and their respective valve guides 41 and 41a. Thus, the presence or absence of hydraulic fluid within the pistons 43 and 43a does not effect the operation of the valve mechanism.

The passageways 69 and 69a serve another useful purpose in that they permit the connecting members to be operated when either or both O rings 65 and 65a are somewhat worn and no longer provide fluid tight seals between the valve pistons 43 and 43a and their respective valve guides 41 and 41a. The passageways 69 and 69a allow the hydraulic fluid entering the interior of the valve pistons through the defective O rings to drain when the connecting members are disengaged and thereby permit the connecting members to operate as effectively as if the O rings provided a fluid tight seal between the valve pistons 43 and 43a and their respective guides 41 and 41a. Otherwise the hydraulic fluid which seeped past the defective O rings would fill the interior of the valve pistons with incompressible hydraulic fluid causing the connecting members to become inoperative. Naturally, when either of the O rings 65 or 65a become so worn that a large amount of hydraulic fluid flows into the interior of their respective valve pistons 43 or 43a, and then outwardly through their respective passageways 69 or 69a that O ring should be replaced. The presence of the passageways 69 and 69a thereby allows one to ascertain at all times the condition of the O rings 65 and 65a.

In order to facilitate the back and forth movement of the sleeve 101 by the operator when the members 11 and 71 are engaged and disengaged, the outer surfaces of the sleeve 101 includes a depressed section 119 which is knurled to provide a surface which may be easily gripped by the operator. The depressed section 119 also provides an area which may be clamped in a mounting bracket or the like. A safety mounting bracket for use with valved couplings having such a sliding sleeve is disclosed and claimed in our copending application Serial No. 62,202 which was filed on November 26, 1948 and which is assigned to the assignee of the present invention.

In some applications of couplings of this type the members are disconnected from one another for prolonged periods of time. Desirably, under these conditions, the open socket end 77 of the female coupling is provided with a dust cap 121 (Fig. 1). The dust cap 121 includes a circular diaphragm 123 of flexible material such as rubber or fabric having a band of resilient material 125 such as rubber or the like. The resilient band 125 is adapted to be engaged in a circumferentially disposed groove 127 disposed about the forward end of the sleeve 101, the flexible diaphragm 123 covering the socket 77.

We have discovered that an extremely efficient seal may be effected in a valve having a resilient sealing member and a substantially rigid seat when the initial contact between the sealing member and the seat is along a line as opposed to the surface to surface contact such as is provided in the usual valve. A particularly satisfactory seal is obtained in spring pressed valves of the type employed in the illustrated coupling when the initial line contact between the resilient packing material and the valve seat is made along a circular path. In the illustrated device, the circular line-contact is made possible by fabricating the resilient packing ring 45 with a slanting forward surface 129 (Figs. 4, 5 and 6) which diverges from the surface of the valve seat 39 radially inwardly of the initial line of contact, the initial contact being made by the shoulder 131 on the packing material 45 (Figs. 4 and 5).

As has been previously pointed out, the packing ring 45 is generally circular in outline and is fabricated from rubber or other similar resilient material. If the hydraulic fluid passing through the coupling is to be oil or other substance which attacks natural rubber, a suitable synthetic resilient material should be employed. In cross section, the particular packing ring 45, illustrated in the drawing, has four sides. Two of the sides, designated as 133 and 135 in Figs. 4, 5, and 6, are disposed normal to one another, side 133 extending longitudinally of the valve piston 43 and side 135 extending radially of the piston 43 along the forward surface of the bearing ridge 61. It should be understood, however, that the form and relative disposition of these sides are not an important part of the invention. They merely provide a support for the surfaces which define the shoulder 131 and may take any convenient form. The third side, the sealing surface 129, extends outwardly and rearwardly from the forward edge of the side 133, and is angularly disposed relative to the bevelled valve surface 39. The angular relation of the surfaces 129 and 39 is of considerable importance in accomplishing the improved seal of the present invention. The angle between these surfaces, the angle $\beta$ of Fig. 5, should not be greater than about 6 degrees, or less than about 4 degrees, and an angle of about 5 degrees is particularly satisfactory when using ordinary viscosity hydraulic fluid. The fourth surface, designated 137, extends generally longitudinally of the piston 43 between surfaces 129 and 135, and is disposed so as to provide line contact between the valve seat 39 and the sealing surface 129. It is important that the line contact between these surfaces, 39 and 129, be maintained along the intersection of the surface 137 and the sealing surface 129, as is shown in Figs. 5 and 6. If this contact is not maintained, hydraulic fluid will flow between the bevelled valve surface 39 and sealing surface 129. Consequently when the hydraulic fluid is under pressure, a substantial force component is exerted rearwardly on the packing ring 45 tending to break the seal between it and the valve seat 39 thereby causing loss of hydraulic fluid. The exact angular relation of the surfaces 129 and 137 is not critical as long as the line contact is provided.

Desirably, the packing ring 45 is attached to the piston 43 by vulcanizing or cementing the surfaces 133 and 135 to the ridge 61 and to the external surface of the piston so that an undeformed slanting forward surface, 129, is obtained. When the surface 129 and the shoulder 131 are accurately shaped as above described, an extremely effective seal is made between the piston 43 and the seat 39 with a relatively light biasing force.

In the foregoing there has been described a quickly disengageable, two member, valved coupling which is adapted to efficiently seal the ends of the fluid conduits associated with the coupling. The coupling embodies various novel constructional features which cooperate to provide a device of the class described which may be interengaged by the exertion of a relatively small force regardless of the hydraulic pressures maintained within the associated hydraulic system. This desirable operational characteristic results from the use of a novel type valve guide and valve piston arrangement and from the use of O ring-type seals on all of the sliding connections. The described coupling also includes an improved interlocking means which combines inexpensive construction and ease of assembly with an easily operable, retractible ball locking arrangement and a highly effective dust seal. Further, the illustrated coupling includes an improved valve packing construction which causes a spring pressed valve to effectively stop the flow of fluid through the valve upon the initial contact of the valve packing with the valve seat. This packing construction together with the O ring type seal between the male and female connecting members and the valve piston and guide arrangement permit the interengaging and disengaging of the connecting members with a minimum loss of hydraulic fluid.

Various of the features of the invention which are believed to be new are set forth in the appended claim.

We claim:

In a valved coupling of the class described, a male connecting member which includes a generally tubular housing having an annular groove formed in the outer surface thereof, and a female connecting member having a generally tubular housing into the forward end of which the housing of said male connecting member is inserted, the housing of said female connecting member having a plurality of radially disposed, circumferentially arranged apertures at the forward end thereof, ball members disposed in said apertures for movement from an inner, coupling-locking position to an outer, coupling-releasing position, said ball members being in engagement with the walls of the groove in the outer surface of said male housing, and means limiting inward movement of said balls beyond the coupling-locking position comprising a band of spring material disposed within the housing of said female connecting member adjacent said circumferentially arranged ball members, said band having a plurality of holes formed therein each having a diameter which is slightly smaller than the diameter of said ball members, means defining a seat for said band on the inner surface of the housing of the female connecting member to prevent longitudinal movement of said band relative to said associated housing, and means for moving said ball members into and out of the holes in said band whereby said ball members are moved from the coupling-releasing position to the coupling-locking position.

GENE L. OMON.
KURT E. HOHNL.

(References on following page)

References Cited in the file of this patent

UNITED STATES PATENTS

| Number | Name | Date |
|---|---|---|
| Re. 23,120 | Earle et al. | June 14, 1949 |
| 166,489 | Westinghouse | Aug. 10, 1875 |
| 804,272 | Schwarz | Nov. 14, 1905 |
| 1,105,255 | Caskey | July 28, 1914 |
| 1,493,306 | Wilkinson | May 6, 1924 |
| 1,811,166 | Yardley | June 23, 1931 |
| 2,135,222 | Scheiwer | Nov. 1, 1938 |
| 2,192,425 | Allen | Mar. 5, 1940 |
| 2,232,739 | Sharp | Feb. 25, 1941 |
| 2,413,571 | Krone | Dec. 31, 1946 |
| 2,473,973 | Scheiwer | June 21, 1949 |

FOREIGN PATENTS

| Number | Country | Date |
|---|---|---|
| 552,435 | Great Britain | Apr. 7, 1943 |